May 19, 1964  C. C. RAYBURN  3,134,059
WOUND CAPACITOR
Original Filed Aug. 20, 1958　　　　　　　　2 Sheets-Sheet 1
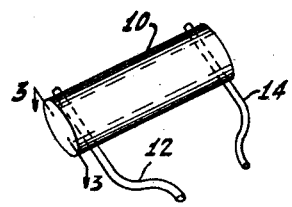
Fig. 1.
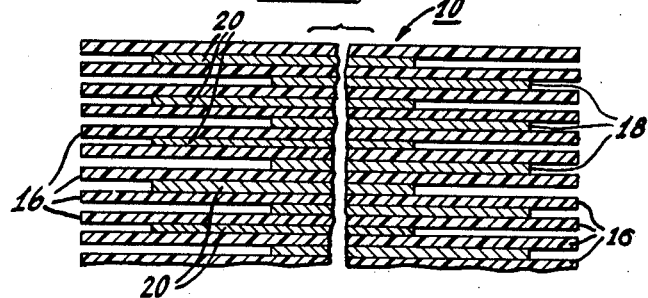
Fig. 2.
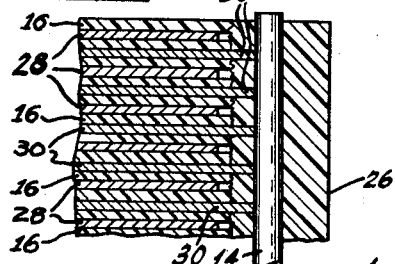
Fig. 3.
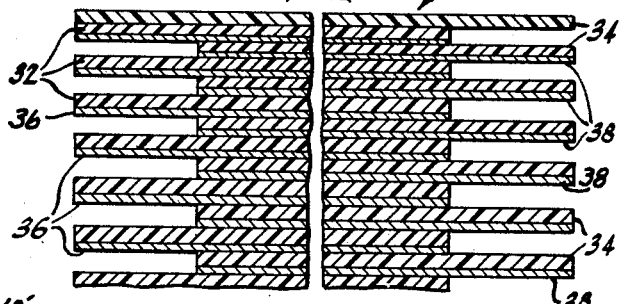
Fig. 4.
Fig. 5.
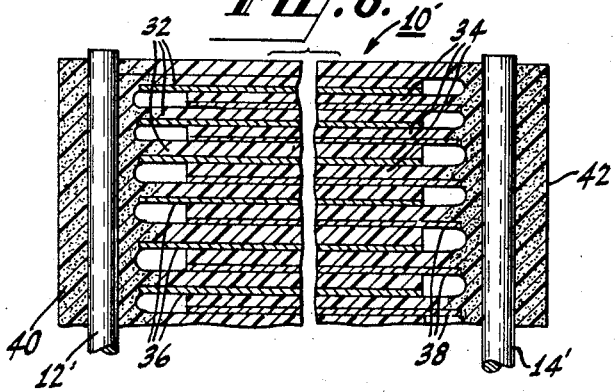
Fig. 6.
INVENTOR.
Charles C. Rayburn
BY
ATT'Y.

May 19, 1964  C. C. RAYBURN  3,134,059
WOUND CAPACITOR

Original Filed Aug. 20, 1958  2 Sheets-Sheet 2

INVENTOR.
Charles C. Rayburn
BY Robert Q. Silver
ATT'Y.

United States Patent Office 3,134,059
Patented May 19, 1964

3,134,059
WOUND CAPACITOR
Charles C. Rayburn, Falls Church, Va., assignor, by mesne assignments, to Illinois Tool Works, Inc., a corporation of Delaware
Original application Aug. 20, 1958, Ser. No. 756,121, now Patent No. 3,040,415, dated June 26, 1962. Divided and this application Oct. 25, 1961, Ser. No. 147,646
11 Claims. (Cl. 317—260)

This invention relates to a wound capacitor and is a division of my application S.N. 756,121, filed August 20, 1958, now Patent No. 3,040,415.

Wound capacitors are normally fabricated from strips or tapes of conductive material such as a metal or a conductively coated dielectric wound into a tight coil. In winding the capacitor coil, two or more conductive tapes are wound together with dielectric material between the conductive tapes to insulate them from each other. In forming the capacitor coil, the conductive tapes are staggered so that the edge of one tape extends beyond one edge of the other tape, while the opposite edge of the other tape extends beyond the corresponding edge of the first. Thus, normally in winding the condenser coil, two conductive tapes are wound in the staggered arrangement with the intermediate dielectric material positioned only between the overlapping portions of the two tapes. The wound capacitor coil thus has the extending edge of each tape forming a different end of the coil. One lead wire is soldered at each end of the coil to portions of the extending edge of the corresponding conductive tape.

Wound capacitors, fabricated from plastic or paper dielectric materials, are, in many respects, satisfactory. However, such capacitors also have certain disadvantages. The conductive tapes of one type of wound capacitor is a thin tin foil, which has little interent mechanical strength, so that when the leads are soldered to the edges of the foil tapes, care must be exercised in the use of the capacitor to prevent tearing away the leads from the capacitor. In an attempt to provide a more economical wound capacitor, aluminum foil has been used with the resulting normal difficulty of soldering lead wires to aluminum. Another type of wound capacitor is that in which the conductive portions of the capacitor are formed from plastic tapes having a metallized coating on one side. Again, a serious problem exists when lead wires are connected to the edges of the metallized plastic tapes in providing a good contact with the metallized coatings of the capacitor, as well as in providing a sufficiently strong physical connection between the lead and the plastic tapes.

It is, therefore, an object of this invention to provide an improved wound capacitor, in which the leads connected to the ends thereof are rigidly and strongly fixed.

It is another object of this invention to provide an improved wound capacitor, in which the leads are firmly fixed to the capacitor and in good contact with the plates of the capacitor.

It is a further object of this invention to provide a wound capacitor utilizing thin metal foil tapes and in which the leads are strongly attached to the foil tapes.

It is another object of this invention to provide a wound capacitor utilizing metallized plastic tapes, in which the leads are strongly adherent to the capacitor.

The specific invention is that in which the wound capacitor is fabricated from wound tapes, either of metal foil and plastic tapes, or metallized plastic tapes. In fabricating the capacitor from metal foil and plastic tapes, the foil tapes are separated from each other by winding between them a wider dielectric plastic tape, so that the edges of the plastic tape extend beyond the edges of the foil tapes. The leads are attached to the capacitor, wound in this manner, by heating the leads to a sufficiently high temperature so that when one lead is placed against each end of the capacitor coil, the lead will melt the extending edges of the plastic tape. The plastic of the tape will flow away and permit the heated lead to be forced into contact with the adjacent edge of one of the metal foil tapes. Upon cooling, the melted plastic fuses into a solid portion locking the lead within the edge of the capacitor coil and tightly against the edge of the metal foil. The same technique is applicable to a capacitor wound from metallized plastic tapes. It has been found that the heated lead will melt the plastic of the metallized tape and permit the forcing of the lead into the end of the capacitor coil. Upon cooling, the melted plastic fuses around the lead to lock the lead within the end of the capacitor coil. There is sufficient metallizing material within the fused portion of the plastic material to provide good conductivity between the lead and the conductive strips of the capacitor.

FIG. 1 discloses a schematic representation of a wound capacitor in accordance with the invention.

FIG. 2 is a schematic representation of the arrangement of the several tapes used in winding a capacitor in accordance with the invention.

FIG. 3 is a sectional view along lines 3—3 of FIG. 1.

FIG. 4 is a partial sectional view of a wound capacitor in accordance with a first modification of the invention.

FIG. 5 is a partial sectional view of a portion of the arrangement of the tapes used in winding a second modification of the invention.

FIG. 6 is a sectional view of a portion of a wound capacitor in accordance with the second modification of the invention.

Figure 7:
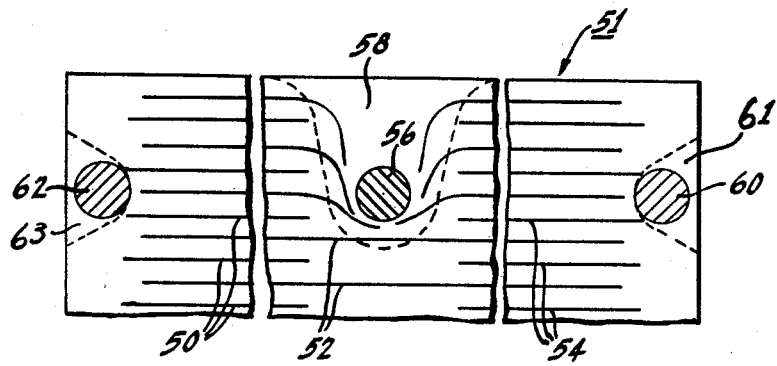
FIG. 7 is a schematic sectional view of another modification of the invention.

FIG. 1 discloses a wound capacitor consisting of a capacitor coil 10 formed from tightly wound tapes or strips of conductive and plastic material. Fixed to opposite ends of the capacitor coil 10 are different leads 12 and 14. FIG. 2 schematically represents the arrangement in which the plastic and conductive tapes, forming the capacitor coil 10 of FIG. 1, are wound in accordance with the invention. As is common practice, the several tapes are wound simultaneously, one on top of the other, around a central spindle or mandrel, with the edges of the several tapes lying in parallel planes. If the capacitor has two plates, it is wound from two conductive tapes which are separated from each other by one or more thicknesses of a plastic tape.

FIG. 2 discloses the arrangement which the tapes have, relative to each other, in the capacitor coil. The parts, shown in FIG. 2, are obviously exaggerated in size to provide a clarity of presentation. The plastic tape is represented by the reference numeral 16 and is shown as being between the overlapping conductive tapes represented at 18 and 20. The two conductive tapes 18 and 20 may be of a metal foil such as tin, for example. The metal tapes 18 and 20 overlap each other over a greater portion of their areas. However, as viewed in FIG. 2, the right-hand edge of tape 18 lies in a plane and extends to the right beyond the plane of the adjacent edge of tape 20. In a similar manner, the left-hand edge of tape 20 lies in a plane and extends to the left beyond the plane of the adjacent edge of tape 18. In this manner the tapes 18 and 20 are staggered, which is common practice to enable a lead to be fixed only to tape 18 at its right-hand edge, as viewed in FIG. 2 and another lead to be attached only to a tape 20 at its left-hand edge.

However, in accordance with the invention the plastic tape 16 is provided wider than either of the metal tapes 18 and 20 and is of sufficient width so that its edges extend beyond the right-hand edge of tape 18 on the right and the left-hand edge of tape 20 on the left, as viewed in FIG. 2. Furthermore, in accordance with the invention, the leads 12 and 14 are connected to the ends of the condenser coil in the following manner:

Each lead is heated to a sufficiently high temperature to melt the plastic material of the tape 16. As shown schematically in FIG. 3, with respect to lead 12, the lead is part of an electric circuit 22 connected to a source 24 of electrical power. Sufficient current is passed through lead 12 to heat it to a high temperature. It is then pressed against the left-hand end of coil 10, as viewed in FIG. 3. The heated lead 12 coming in contact with the edge of tape 16 melts the plastic material of the tape and permits the forcing of the lead 12 into contact with portions of the left edge of tape 20. Current flow through lead 12 is cut off, either at this time or just previously, and the plastic material of the edge of tape 16 cools and fuses together to form a solid plastic mass 26. The plastic mass 26 hardens around the lead 12 and holds the lead against the left edge of tape 20. Furthermore, the plastic mass 26 retains continuity with the plastic tape 16 and is thus tightly fixed to the coil 10. If tape 20 is of tin foil and lead 12 is appropriately tinned, then the left edge portions of the tape 20 will solder to the lead 12 as indicated at 13.

A further advantage is gained with the structure described above, if the plastic dielectric tape 16 is of a material such as polyethylene terephalate or a perflurocarbon resin such as "Teflon," which is made of 100–X perfluorocarbon resin furnished by the E. I. Du Pont Company of Wilmington, Delaware. These types of plastics have the physical characteristic of shrinking upon fusing from a melted condition. This shrinking upon fusing of the plastic material tightly forces the lead 12 against the left edge of tape 20. Thus, even if there is no soldering action between the edge of tape 20 and lead 12, the physical forcing of lead 12 against the edge of the tape by the fusion of the plastic mass 26 is more than sufficient to provide a lasting and good electrical connection between lead 12 and the edge of metal foil 20. This has been found to be particularly useful where aluminum foil is used, which will not readily solder to a commonly used lead structure.

FIG. 4 schematically represents a first modification of the invention, in which the conductive tapes consist of overlapping aluminum foil strips 28 and 30. Lead 14 in this modification is joined to the right-hand edge of tape 30, as viewed in FIG. 4, in the same manner described above with respect to the attachment of lead 12 to the edge of tape 20. The fused mass of plastic material 26, which is formed from the melted edge portions of tape 16 tightly binds lead 14 against the edge of tape 30. In this manner, not only is lead 14 tightly cemented into the end of the condenser coil, but because of the nature of the plastic tape used, it is firmly held against the edge of the aluminum tape 30.

The particular plastic materials listed above, namely polyethylene terephthalate and perfluorocarbon resin peculiarly adapt themselves to the described technique of fastening the lead wires 12 and 14 to the condenser coil. As the heated lead wires are forced into the ends of the condenser coil, the plastic material appears to flow completely away from the adjacent portions of the metal foils, so that the lead wires come into intimate contact with the foil edges and with no apparent film of plastic between the foil and the lead, which would tend to provide a poor electrical connection between the two. In fact, in the adaptation of FIG. 3, in which the lead 12 becomes soldered to the edge of foil 20, the solder joint between foil 20 and lead 12 is so readily formed that the plastic appears to aid in the soldering rather than providing a neutral effect.

The novel technique disclosed, in accordance with the invention, lends itself extremely well in the fabricating of wound condensers from metallized plastic tapes. In FIG. 5 a cross section area of a portion of a capacitor coil winding 10′ is shown, in which a pair of metallized plastic strips or tapes 32 and 34 are disclosed, wound in a staggered arrangement such that the left edge of tape 32, as shown in FIG. 5, extends beyond the corresponding edge of tape 34 and the right edge of tape 34 extends beyond the corresponding edge of tape 32. Tape 32 may be formed from a plastic material of or similar to polyethylene terephthalate or perfluorocarbon resin. One surface of tape 32 is metallized or coated with an appropriate conductive material forming a film 36. In a similar manner, tape 34 is fabricated of the same type of plastic material and with a conductive coating 38 on one surface. The conductive coatings 36 and 38 may be applied to the plastic tape as finely divided metal, such as tin, copper, aluminum or zinc. The two tapes 32 and 34 are wound together in the staggered arrangement shown, with the conductive coating of each type in contact with the dielectric surface of the other tape. To increase the insulation between the conductive films 36 and 38, the coil 10′ may be wound with an additional uncoated plastic or dielectric tape between the two tapes 32 and 34.

Leads 12′ and 14′ indicated in FIG. 6, are attached to the opposite ends respectively of condenser coil 10′ and in the same manner set forth above with respect to the modification of FIGS. 3 and 4. The leads are heated and pressed into the respective ends of the condenser coil 10′. However, in this case, care is taken so that the leads will not be forced sufficiently far to contact simultaneously both of the conductive portions 36 and 38. Upon cooling, the plastic material of the tape 32 will fuse into a mass 40, which rigidly holds the lead 12 to the condenser coil. Since it has continuity with the unmelted portions of tape 32, the plastic mass 40, as well as lead 12, is tightly held to the condenser coil. Also in a similar manner, the melted portions of tape 34 fuse into a plastic mass 42 embedding lead 14 and tightly holding it to the tape 34.

It has been found that the plastic masses 40 and 42 contain sufficient amount of the conductive material from the edge portions of the conductive films 36 and 38, that good electrical conductivity is retained between the leads 12′ and 14′ and the conductive coatings 36 and 38, respectively. Because of this fact, it is wholly practical to attach lead wires to wound capacitors formed from metallized plastic tape, in the manner described. The resulting structure is one in which the metal leads are tightly attached to the capacitor coils and provide good electrical connection between the leads and the respective metallized tape.

The lead embedding technique, described above, also readily adapts itself to condensers made from more than two staggered conductive tapes, in which intermediate conductive tapes form floating plates of the condenser. Such a condenser is disclosed more fully in the copending application S.N. 686,069, filed September 25, 1957, by Charles C. Rayburn. FIG. 7 schematically discloses a condenser of this type, in which leads are fixed in accordance with the invention. The condenser consists of a conductive foil tape 50 wound into the condenser coil 51 and in an overlapping arrangement with one end of a second intermediate conductive foil tape 52, which in turn is wound into the coil 51 with its other end in an overlapping arrangement with a third conductive tape 54. The intermediate tape 52, thus, has its opposite ends overlapping one of the other tapes 50 and 54, respectively. The overlapping tape portions are insulated from each other by plastic or dielectric tapes wound between tapes 50, 52 and 54, respectively. The tape 52 forms a floating plate relative to tapes 50 and 54. The insulating plastic tapes positioned between the conductive tapes 50, 52 and 54 are not shown in FIG. 7, in order to simplify the drawing.

Tape 52 may be readily connected to a lead 56, in the manner described above, in which the lead 56 is heated to a temperature, at which it will cause the plastic material of the plastic tapes to melt. The heated lead 56 is pressed into the side of the condenser coil. The melted material of the plastic tapes will flow away and lead 56 will break through the outer layers of tape 52, if the tape is tin foil and contact the central layers of tape 52. If lead 56 is tinned, it will readily solder to each layer of tape 52, where the lead make contact with the turns of coiled tape 52. Upon cooling, the melted plastic material of the plastic tapes solidifies into a hardened mass schematically represented 58, which is fused to the plastic tapes and which tightly locks lead 56 within the condenser coil. If tape 52 is of aluminum, the fused plastic mass 58 will hold lead 56 in contact with tape 52 to provide a good electrical connection. A second lead 60 is heated and embedded in the end portion of the condenser coil and in contact with end portions of tape 54. Upon cooling the material of the plastic tapes solidifies to form a fused plastic mass, schematically represented at 61, which forms continuity with the plastic tapes. A third lead 62 is heated and embedded in the opposite end of the condenser coil and in contact with the edge portions of tape 50. The material of the plastic tapes also solidifies into a hardened mass, schematically represented at 63, which embeds connector 62 within the condenser coil 51. Leads 60 and 62 are fixed to the condenser coil in the manner described above and in accordance with the invention.

Figure 8:
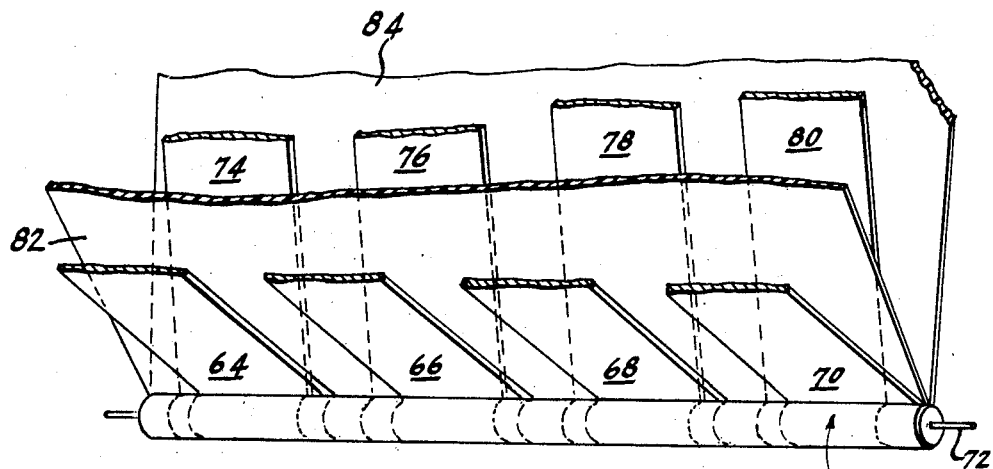
FIG. 8 is a schematic representation of a mode of fabrication of a plurality of capacitors in accordance with the invention.

The technique of winding the condenser coils from plastic tapes, whose edges extend beyond and cover the edges of the foil tapes, readily lends itself to the mass production of tape-wound condensers by a technique, in which wide sheets of plastic tape can be wound simultaneously with a large number of foil tapes. For example, in FIG. 8 there is disclosed such a technique. One series of metal foils 64, 66, 68 and 70, are wound on a mandrel 72 simultaneously with a second series of matching metal foil tapes 74, 76, 78 and 80, which are staggered to only partially overlap, respectively, tapes 64, 66, 68 and 70. At the same time, a large sheet of plastic tape 82 is wound between the two series of tapes to insulate the overlapping pairs of tapes. A second large plastic sheet tape 84 is simultaneously wound on top of the second series of foil tapes 74–80. After completion of the winding, the resulting coil may be cut so as to separate the overlapping pairs of metal tapes into individual condensers. Metal leads are then attached to the ends of the condenser coils in the manner described above. FIG. 8 merely illustrates one arrangement in which the tapes are wound together. It is obvious that other arrangements are possible.

In fabricating each of the different condenser coils, shown in FIGS. 2, 3, 4 and 7, plastic tapes are used sufficiently wide that their edges extend beyond the edges of the metal tapes with which they are wound. This results in the metal tapes being protectively insulated from outside contact. Furthermore, the described technique of fixing the leads to the condenser coil forms a solid plastic region at each end of the condenser coil which insulatingly encloses the ends of the metal tapes within the coil. In the modification of FIGS. 5 and 6, to provide insulating ends of the capacitor coil 10′, the metallic coatings 36 and 38 should not extend to the edges of tapes 32 and 34, respectively. Thus, plastic portions 40 and 42 also will not be conducting at their outer surfaces.

Because of the novel method of winding the capacitor coil with a dielectric tape of sufficient width to overlap the conductive tapes, capacitors, made in the manner described, do not thus require the added step of insulating the exposed edges of the conductive tapes, as is necessary in conventionally wound capacitors. Furthermore, as set forth above, the novel technique described provides considerably greater lead strength than that supplied, when the leads were soldered to exposed foil edges. The novel technique readily lends itself to fabricating capacitors from aluminum foil, as well as from metallized dielectric tapes, both of which previously were difficult to manufacture because of the inability to easily secure leads to the aluminum foil or to the metallized film of the plastic tape. The novel capacitor described is one which has greater ease of fabrication and can be mass-produced with a minimum amount of handling. The novel capacitor is one in which the conductive tapes are insulatingly covered by the wider plastic tapes. Thus, insulating dip coatings or other insulating encasements are not required and the added step of dip coating coupled with the considerable time required for curing and drying the coating is eliminated.

The novel capacitor readily adapts itself to ease in fabrication in other ways. Additional insulation can be readily added to the outer surface of the capacitor by continuing the winding of the dielectric tape for any desired amount, after the termination of the winding of the conductive tapes. A capacitor, of the type described, which does not require dipping and coating, adapts itself more readily to automatic machine fabrication, which would include, as part of the winding cycle, the marking of the capacitor before heat sealing and cutting of the tape and leads.

I claim:

1. A convolutely wound capacitor comprising first and second films of plastic tape of predetermined widths, electrode foil means interposed intermediate said first and second films, no part of which extends beyond the edge surfaces of said films, said films and electrode foil means being convolutely wound into a form having spaced end surfaces, and electrical lead means secured adjacent to at least one of said end surfaces, said electrical lead means traversing and substantially bisecting said one end surface and held in physical contact with said electrode foil means by a fused portion of the edge portion of at least one of said plastic films.

2. A wound capacitor comprising first and second films of plastic tape having edge surfaces and wound in roll form, electrode foil means interposed intermediate said first and second films, no part of which extends beyond the said edge surfaces of said films, said films and electrode foil means as a unit having spaced end surfaces, and electrical lead means secured adjacent to at least one of said end surfaces, said electrical lead means traversing and substantially bisecting said one end surface and held in physical and electrical contact with a portion of substantially every turn of said electrode foil means by portions of the edges of at least one of said plastic films.

3. A convolutely wound capacitor comprising first and second films of dielectric material, electrode foil means interposed intermediate said first and second films, said films and electrode foil means being convolutely wound into a generally cylindrical form having spaced parallel end surfaces, and electrical lead means secured to each of said end surfaces, said electrical lead means each traversing and substantially bisecting one of said end surfaces and held in physical and electrical contact with said electrode foil means, said electrical lead means being electrically conductive wire embedded in each of said end surfaces so as to be located adjacent thereto and not protruding beyond the end surfaces as measured parallel to the axis transverse to said end surfaces.

4. A wound capacitor comprising first and second films of plastic tape having spaced edge surfaces and wound in roll form, a pair of electrode foil means capacitively interposed intermediate said first and second films with no part of said foil means extending beyond the said respective spaced edge surfaces of said films, said plastic films extending along the axis of said roll a greater distance than said electrode foil means whereby the edge surfaces of said films as a wound unit define the spaced end surfaces of the roll generally transverse to the axis of the roll, and electrical lead means respectively secured adjacent to each of said end surfaces, said respective electrical lead means respectively traversing and interrupting each of said end surfaces to engage substantially every discrete winding of said electrode foil means and being disposed substantially parallel with said end surfaces and held in physical and electrical contact with different ones of said electrode foil means by portions of the edges of said plastic films adjacent to said end surfaces.

5. The capacitor set forth in claim 4 wherein said electrode foil means are aluminum.

6. The capacitor set forth in claim 5 wherein the electrical lead means are held to said aluminum electrode foil means by a pressure bond of fused plastic.

7. The capacitor set forth in claim 5 wherein the discrete points of engagement of said electrical lead means with said discrete windings of aluminum electrode foil means are substantially totally surrounded by fused plastic.

8. The capacitor set forth in claim 4 wherein each of said electrical lead means has a portion which extends from the circumference of the roll to the axis of the roll substantially in a diametral plane of the roll to intersect substantially every discrete winding of the electrode foil means.

9. The capacitor set forth in claim 8 wherein said electrical lead means extends from circumference to circumference substantially in a diametral plane to interrupt substantially every discrete winding of electrode foil means in two places substantially at 180° to each other.

10. The capacitor set forth in claim 4 wherein third electrical lead means is attached to said roll substantially transverse to the axis of the roll and intermediate the respective lead means secured to said end surfaces.

11. A convolutely wound capacitor comprising first and second films of dielectric material, electrode foil means interposed intermediate said first and second films in capacitive relationship, said films and electrode foil means being convolutely wound in generally cylindrical form having spaced parallel end surfaces transverse to the winding axis, said end surfaces being the edge surfaces of dielectric films, the wound capacitor having the edge surfaces of said electrode foil means disposed entirely within said cylindrical form and spaced inwardly from said end surfaces, and electrical lead means secured adjacent each of said end surfaces, said electrical lead means being disposed such that each traverses one of said end surfaces substantially parallel thereto and substantially intersecting the mid point thereof and held in physical and electrical contact with said electrode foil means by said dielectric films, said electrical lead means being electrically conductive wires embedded in said end surface so as to be located adjacent thereto and not protruding beyond the end surfaces as measured parallel to the winding axis transverse to said end surfaces.

References Cited in the file of this patent
UNITED STATES PATENTS

| | | |
|---|---|---|
| 2,090,360 | Sprague | Aug. 17, 1937 |
| 2,785,352 | Netherwood | Mar. 12, 1957 |
| 2,873,304 | Davidson | Feb. 10, 1959 |
| 2,917,687 | Haas | Dec. 15, 1959 |
| 3,009,086 | Rice et al. | Nov. 14, 1961 |